(12) United States Patent
Blanc

(10) Patent No.: US 7,107,742 B2
(45) Date of Patent: Sep. 19, 2006

(54) AUTOMATIC PACKING DEVICE FOR THE FILLING OF CONTAINERS BY MEANS OF SUPERPOSED LAYERS OF PRODUCTS, IN PARTICULAR FRUITS SUCH AS ORANGES

(75) Inventor: Philippe Blanc, Montauban (FR)

(73) Assignee: Material pour l'Arboriculture Fruitiere, Montauban (FR)

( * ) Notice: Subject to any disclaimer, the term of this patent is extended or adjusted under 35 U.S.C. 154(b) by 0 days.

(21) Appl. No.: 10/901,244

(22) Filed: Jul. 29, 2004

(65) Prior Publication Data
US 2005/0028495 A1     Feb. 10, 2005

Related U.S. Application Data

(60) Provisional application No. 60/517,887, filed on Nov. 7, 2003.

(30) Foreign Application Priority Data
Aug. 5, 2003 (FR) .................................. 03 09636

(51) Int. Cl.
B65B 35/30 (2006.01)
(52) U.S. Cl. ...................... 53/537; 53/153; 53/202; 53/391; 53/542; 53/544
(58) Field of Classification Search .......... 53/152–154, 53/202, 235, 237, 244, 247, 248, 531, 537, 53/540, 547, 391, 534, 542, 544
See application file for complete search history.

(56) References Cited

U.S. PATENT DOCUMENTS 3,292,341 A * 12/1966 Frost .......................... 53/495
3,338,009 A * 8/1967 Stevens ....................... 53/245
3,453,802 A    7/1969 Riddington
3,465,495 A * 9/1969 Riddington et al. .......... 53/537
3,590,551 A * 7/1971 Riddington et al. .......... 53/494
3,609,938 A * 10/1971 Paddock ....................... 53/499
3,928,942 A   12/1975 Paddock et al.
4,329,831 A * 5/1982 Warkentin et al. ............ 53/537
4,386,491 A * 6/1983 Cramer et al. ................ 53/247
4,435,941 A * 3/1984 Booth et al. .................. 53/475
4,583,910 A    4/1986 Borgman et al.
4,712,818 A   12/1987 Borgman et al.

(Continued)

FOREIGN PATENT DOCUMENTS

DE         25 19 633       11/1976

(Continued)

Primary Examiner—Scott A. Smith
Assistant Examiner—Gloria R. Weeks
(74) Attorney, Agent, or Firm—Young & Thompson

(57) ABSTRACT

An automatic packing device for filling containers with products, includes: two separate feed stations, each adapted to arrange a stream of products in parallel rows; elements capable of picking up alternately, in each feed station and depositing in the container, a number of products forming a layer of the container. Each feed station includes: a conveyor having a plurality of articulated transverse profiles; elements for pivoting two successive profiles in opposite directions of rotation between a first position in which the profiles form a transverse trough in the shape of a V, and a second position in which the profiles form a ridge in the shape of an inverted V, so as to form waves of products on the conveyor; a plurality of channels disposed as a longitudinal continuation of the conveyor.

11 Claims, 6 Drawing Sheets

U.S. PATENT DOCUMENTS

| | | | |
|---|---|---|---|
| 4,905,456 A | * 3/1990 | Olaechea | 53/446 |
| 5,117,611 A | 6/1992 | Heck et al. | |
| 5,457,933 A | 10/1995 | LaVars et al. | |
| 5,575,134 A | * 11/1996 | Main | 53/443 |
| 5,661,949 A | 9/1997 | Blanc | |

FOREIGN PATENT DOCUMENTS

| | | |
|---|---|---|
| EP | 0 644 120 | 3/1995 |
| FR | 2 494 214 | 5/1982 |
| GB | 598619 | 2/1948 |
| NL | 7708236 | 1/1978 |

* cited by examiner

AUTOMATIC PACKING DEVICE FOR THE FILLING OF CONTAINERS BY MEANS OF SUPERPOSED LAYERS OF PRODUCTS, IN PARTICULAR FRUITS SUCH AS ORANGES

CROSS REFERENCE TO RELATED APPLICATIONS

This application claims the 35 USC 119(e) benefit of prior U.S. provisional application No. 60/517,887 filed on Nov. 7, 2003.

FIELD OF THE INVENTION

The invention relates to an automatic packing device for the filling of containers by means of superposed layers of products, in particular fruits such as oranges.

BACKGROUND OF THE INVENTION

As described in particular in the patents U.S. Pat. Nos. 4,712,818, 4,583,910, 5,117,611, FR 2,494,214, NL 7708236 . . . , the current packing devices intended for the automatic filling of containers by means of superposed layers of products, in particular fruits such as oranges, comprise mainly:
  means for transporting the products which are capable, from a flow of products delivered in bulk, of dividing this flow into two separate streams,
  two separate feed stations adapted to arrange each stream of products so that the said products are aligned one behind the other in parallel rows, the products of each row, at one feed station, being disposed in alternate positions with respect to the products of the corresponding rows of the other feed station,
  a central packing station having means for positioning each container which are capable of holding the said container for the purpose of filling it,
  pickup means capable of picking up alternately, in line with each feed station, a number of products forming a layer with dimensions matching the internal section of the container, and of depositing this layer in the said container so as to fill the latter by means of superposed layers of products fixed relative to one another.

Such packing devices have the advantage of being completely automated and of exhibiting a high filling rate. In addition, the filling of the containers is performed by means of layers of products disposed so as to be perfectly fixed with respect to one another, and the risks of damage to these products, particularly when the latter consist of fruits, during the handling and transport of the containers, are therefore dispelled.

A first major disadvantage of these packing devices resides however in the fact that, in particular at the feed stations, blocking phenomena of the products may lead, if not to immobilisation of the stream of products, at least to the formation of incomplete rows having spaces unoccupied by a product.

Consequently, the filling devices must be subject to constant surveillance, which nevertheless does not prevent the obligation to interrupt the device when blocking phenomena occur.

In particular, the feed stations comprising a plurality of parallel channels, each accommodating a line of products, do not permit the products placed in different lines to be disposed so that they are sufficiently compressed radially against one another to be put in place in a container. This is because a sufficient space must be provided between the channels to permit the displacement of the products in the channels.

To overcome this disadvantage, other devices (for example U.S. Pat. No. 3,453,802) provide that the ends of the channels are offset and the orientation of the pickup means is inclined in the plane of the channels with respect to the channels to form a layer of products in a staggered arrangement. Furthermore, a mechanism enables the lateral flanks of the channels either to be moved apart while they are being fed with products, or to be drawn in to compact the products before they are picked up by the pickup means. This solution requires a mechanism which is extremely complex, costly, unreliable and not very compatible with the agricultural environment in which such devices may move about.

U.S. Pat. No. 3,928,942 or 5,457,933 have proposed another solution consisting of articulated guide plates placed above and at the entrance to the container to compact the products as they fall. But this device lacks efficiency in that it may often produce a dislocation of the layer when the products fall into the container, so that they are not correctly placed in a compacted layer in the container, one or more products being raised with respect to the others.

Furthermore, the presence of the channels considerably increases the risks of blockage of the products at the entrance to each channel.

In view of these problems, the most recent packing devices, as described by U.S. Pat. No. 5,661,949 for example, have feed stations without channels, which are now considered to be incompatible with efficient filling of the containers.

The known packing devices also have another disadvantage resulting from the tiresome operations that have to be carried out when there is a change in the size of products to be packed, which change frequently arises when these products consist of fruits, such as oranges, that are sorted beforehand according in particular to their size. Although certain devices, in particular those described in the U.S. Pat. No. 4,712,818, are equipped with fixing devices permitting the rapid mounting and demounting of a plenum bearing the pickup members, for the purpose of adapting the distribution of these pickup members to the distribution of the products according to their size, the operations for modifying the feed stations are, for their part, tiresome.

The packing device described by U.S. Pat. No. 5,661,949 makes it possible to overcome this second disadvantage as well. In this device, any modification in the size simply requires, on the one hand, the changing of the cradles of the feed stations, this operation being quick and easy given the facility of access to these cradles and, on the other hand, the changing of the support bearing the pickup members. In practice, such an adjustment takes a very short time, which minimises the period of immobilisation of the packing device, and does not require personnel with specific skills. However, such a packing device does not solve the disadvantages associated with the recurrent blocking phenomena of the products.

SUMMARY OF THE INVENTION

The present invention aims to overcome this disadvantage and its first object is to provide a packing device with which it is possible to ensure easily the formation of continuous rows of products at each feed station.

Another object of the invention is to provide such a device whose feed stations may be equipped with channels, but which nevertheless ensures efficient filling (high filling rate and operating reliability) in a simple and inexpensive manner.

Another object of the invention is to provide a packing device which can be adapted to different sizes of products in a few quick and easy operations.

Yet another object of the invention is to propose such a device in which any blocking phenomena of the products, in particular at the entrance to the channels of the feed stations, are avoided.

To this end, the invention relates to an automatic packing device for the filling of containers by means of superposed layers of products, in particular fruits such as oranges, of the type comprising:
- a device for transporting the products which is capable, from a flow of products delivered in bulk, of dividing this flow into two separate streams,
- two separate feed stations, each feed station being adapted to receive and arrange one of the two streams of products, and comprising a conveyor and, as a longitudinal downstream continuation of this conveyor, a plurality of parallel channels, each adapted to accommodate a plurality of products aligned one following the other in a row in this channel and in parallel rows in a same plane of reception of the products defined by the said channels,
- a central packing station having a device for positioning each container which is capable of holding the said container for the purpose of filling it,
- a pickup device capable of picking up alternately, in line with each feed station, a number of products forming a layer with dimensions matching the internal section of the container, and of depositing this layer in the said container so as to fill the latter by means of superposed layers of products fixed relative to one another, characterised in that it comprises a device for pivoting the channels of each feed station capable of simultaneously pivoting the said channels in a plane parallel to the plane of reception of the products defined by these channels, between a first position for filling the latter in which their longitudinal axis is oriented so as to form a first angle with the longitudinal axis of the conveyor, and a second position for discharging the channels which is adapted so that the products accommodated in the latter are aligned in orthogonal rows and columns and is obtained for a second angle between the longitudinal axes of the conveyor and the channels, this second angle being greater than the first angle, so that the products accommodated in the various adjacent channels are more tightly packed laterally one against the other in the second position than in the first position.

According to another feature of the invention, the conveyor of each feed station has a plurality of transverse profiles disposed orthogonally with respect to the direction of movement of the said conveyor and articulated about a pivot axis orthogonal to the said direction of movement, each feed station has a device for pivoting the profiles capable of pivoting them about their pivot axis, so that two successive profiles are caused to pivot in opposite directions of rotation between two end positions: a first position in which the said two successive profiles form a transverse trough in the general shape of a V, and a second position in which the said two successive profiles form a ridge in the general shape of an inverted V.

According to the invention, the channels do not therefore extend along the longitudinal axis of the conveyor, but are inclined with respect to this longitudinal axis, so as to "close" somewhat the entrance to the said channels and to ensure against any risk of "doubling" of the products at the entrance to these channels, and therefore any risk of blockage of the packing device.

In the first filling position ($\alpha 1$), the channels are sufficiently spaced from one another laterally that the products of the adjacent channels do not touch, and can move in the channels in order to fill them.

Furthermore, all of the channels of a feed station undergo, after filling, pivoting from $\alpha 1$ to $\alpha 2$, by a value calculated according to the size of the products, making it possible to dispose these products in an arrangement in which they are tightly packed and fixed against one another laterally, thus enabling their transfer into a container.

According to the invention, each feed station therefore has a conveyor forming a succession of "waves" enabling the products to be arranged in transverse rows and these rows of products to be displaced naturally owing to the movement of "waves" which is obtained.

According to this principle, the stream of products is therefore divided into parallel rows of products separated naturally from one another, so that any risk of these products being blocked at the entrance to the channels is dispelled, thus guaranteeing perfect filling of these channels.

Moreover, when the channels are full, the stream of products is naturally immobilised without the need for interrupting the conveyor, so that subsequent filling of the channels, once the latter are emptied by the pickup means, occurs immediately, thus endowing the packing device with a high output without risk of blockage.

According to an advantageous embodiment, the channels extend along a descending slope starting from the conveyor, so as to obtain natural filling of these channels by gravity.

Moreover, advantageously the pickup device has:
- two pickup heads associated with a pivoting device capable of pivoting each pickup head about a horizontal axis between a position for picking up a layer of products disposed in the channels of a feed station, and a position for depositing this layer of products in a container,
- a device for displacing the pickup heads capable of displacing them alternately between a feed station for the purpose of picking up a layer of products and the packing station for the purpose of depositing this layer in a container,
- and a device for vertically displacing the pickup heads capable of displacing them independently between a high position for transfer between a feed station and the packing station and low positions for respectively picking up and depositing the layers of products.

According to another advantageous feature of the invention, the channels of each feed station are mounted on a framework equipped with means for removable fixture capable of enabling it to be fastened to an underframe of the said feed station.

Thus, any modification of the size of the products simply requires a change of the channel clearance, an operation which is quick and easy owing to the disposition of these channels as a continuation of the conveyor of the feed station.

Furthermore, advantageously, the packing station comprises a conveyor for supplying and removing the containers, and members for positioning a container for the purpose of filling it and capable of immobilising the said container in a filling position between the two feed stations.

According to another advantageous feature of the invention, the members for positioning a container comprise members for expansion of the container disposed in the filling position, capable of pressing against inner faces of an upper end of the walls of this container and bringing about appreciable expansion of the latter.

Such expansion members enable perfect centring of the container for the purpose of filling it, and appreciable spreading of the walls of the container so that the latter has an upper opening with a larger section than that of the interior of the said container, facilitating the introduction of the pickup heads.

Moreover, advantageously according to the invention, the positioning members comprise four expansion flaps disposed so as to delimit a volume of rectangular section matching that of the container, the said flaps being borne by pivoting members capable of pivoting them about a horizontal axis between a position in which they extend vertically and spread the walls of the container, and a position in which they extend in an inclined plane and are retracted above the upper face of the container.

Furthermore, these expansion members are advantageously mounted on a framework bearing the conveyor for supplying and removing the containers via a device for height adjustment of the said expansion members capable of permitting adjustment of their relative vertical position with respect to the said conveyor for supplying and removing the containers.

Thus, the packing device according to the invention allows containers of various heights to be filled, by simply adjusting the height of the expansion members.

Finally, advantageously, in an object described in detail hereinbelow, the packing station comprises two longitudinal slides borne by the device for height adjustment of the expansion members and each adapted to accommodate an upper flap of a container.

The device embraces a packing device characterised, in combination, by all or part of the features mentioned above or below.

BRIEF DESCRIPTION OF THE DRAWINGS

Other features, objects and advantages of the invention will emerge from the following detailed description with reference to the appended drawings which show, by way of non-limiting example, a preferred embodiment thereof. In these drawings.

DETAILED DESCRIPTION OF THE INVENTION

Figure 1:
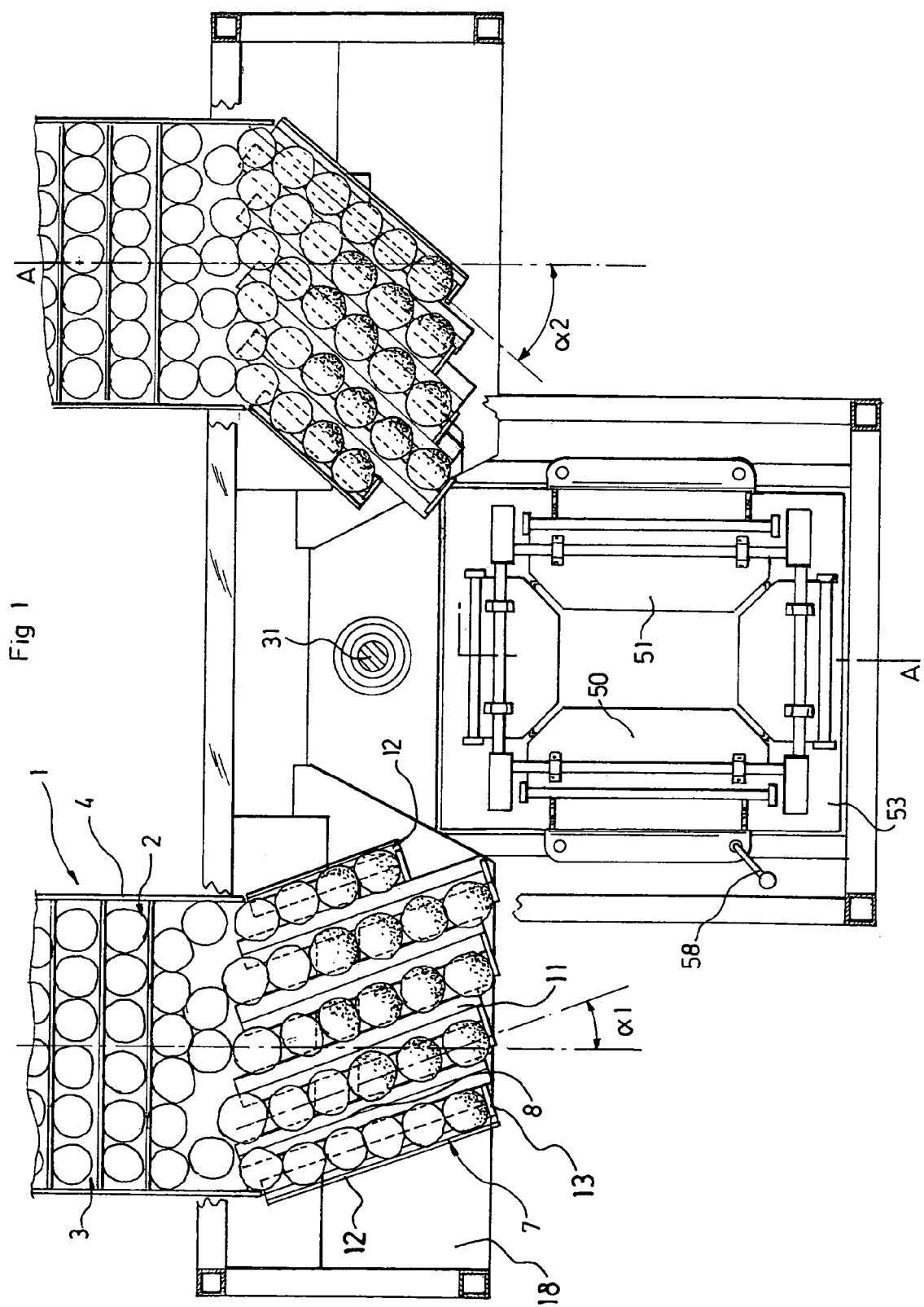
FIG. 1 is a top view of a packing device according to the invention, in which the pickup heads are not shown.

The packing device shown in the figures is designed to effect automatically, from a flow of citrus fruits delivered in bulk, the filling of a carton by means of alternate and superposed layers of these citrus fruits.

As shown in the figures, this packing device comprises, first of all, two feed stations to each of which is distributed a stream of citrus fruits obtained for example after separation of a flow of products in bulk into two separate streams, this separation being obtainable by using transport and separation means such as described in U.S. Pat. No. 5,661, 949.

Each of the feed stations comprises, first of all, a "wave" conveyor 1 comprising a plurality of successive transverse strips such as 2 and 3, extending between two longitudinal cheeks such as 4.

Each of these strips 2, 3 consists of a profile of trapezoidal section, of which the upper face 3a for supporting the products has a flange 3b which is upstream (when considering the direction of displacement of the products) and projects from the said upper face.

Each of these strips 2, 3 is borne by a rotary shaft such as 5, extending between the two cheeks and driven in rotation by any means known per se actuated by a motor 6, for example by joining together strips 2, 3 in pairs and driving in rotation two series of strips thus joined together, by means of two eccentrics offset by 180°, so that two adjacent successive strips 2, 3 are caused to pivot in an opposite direction of rotation between:

a first position, in which the upper faces of these two strips 2, 3 delimit a transverse groove in the general shape of a V, and a second position, in which the upper faces of these strips extend on either side of a crest line and define the general shape of an inverted V.

Each feed station further comprises, as a downstream continuation of the "wave" conveyor 1, a structure for arranging the products in parallel rows, in each of which the said products are positioned one behind the other. The two arranging structures of the two feed stations are similar but adapted so that the products of each row, at one feed station, are disposed in alternate positions with respect to the products of the corresponding rows of the other feed station.

Figure 3:
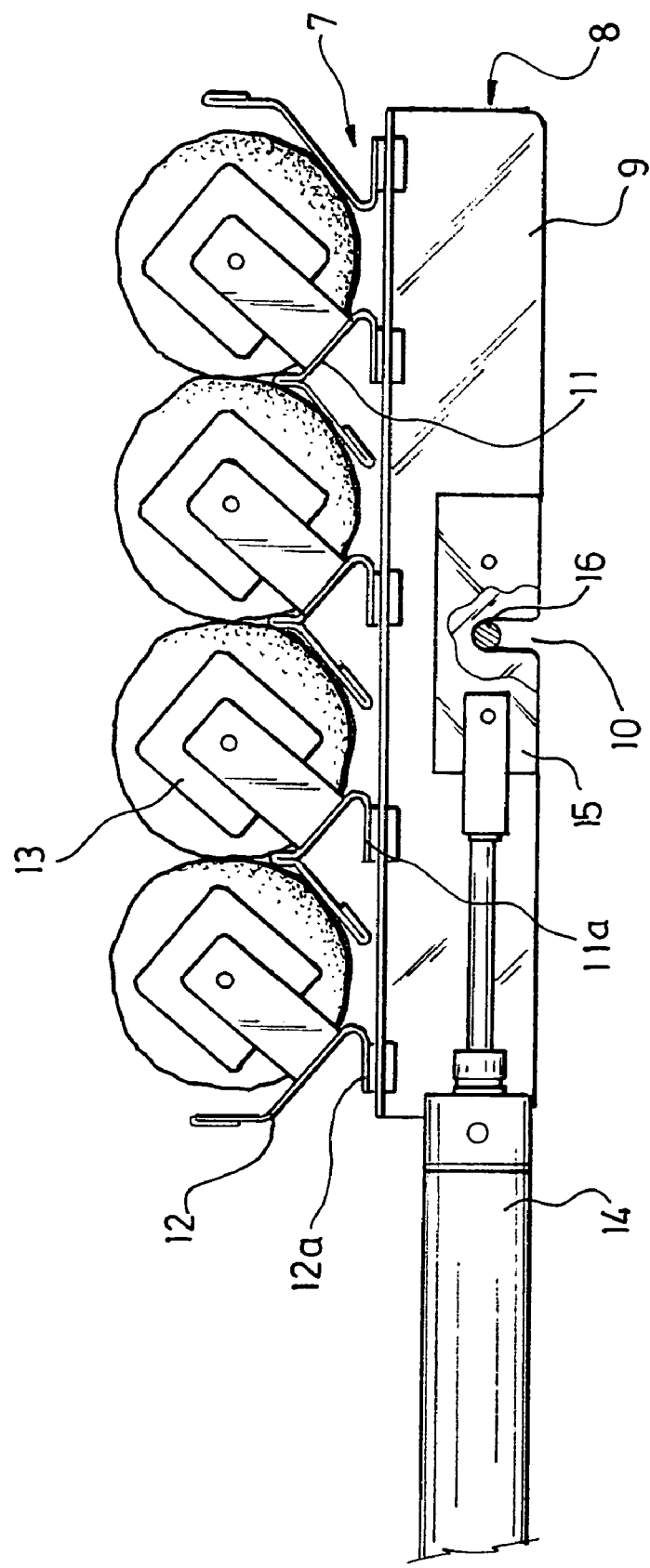
FIG. 3 is a section on an enlarged scale showing the channels of the feed stations.

As shown in FIG. 3, this structure comprises, first of all, a tray 7 which is interchangeable according to the size of the citrus fruits. This tray 7 is composed of a plate 8, beneath which a quick attachment system 10 of the "fork" type is provided, and to which parallel profiles 11, 12 formed from bent metal sheets are fastened, delimiting channels for guiding and arranging the fruits.

The plate 8 consists of a plane plate bent in the form of an angle iron at at least one of its longitudinal ends so as to have a transverse flange 9 in which an axial cutout 10 is made, forming the female part of the "fork" type attachment system of the tray.

Furthermore, the channels for arranging the fruits are delimited, as mentioned above, by parallel profiles 11, 12 extending longitudinally on the plate 8 and consisting, in the example, of three identical median profiles 11 flanked by two identical lateral profiles 12.

The median profiles 11 consist of a metal sheet bent so as to have the general shape of an inverted V, each of the legs of which forms a surface for supporting and guiding a fruit, and one of the legs of which is extended by a horizontal lug 11a forming a foot for fixing to the plate 8. The lateral profiles 12, for their part, also consist of a bent metal sheet forming half an inverted V, defining a surface for supporting and guiding a fruit, and extended by a foot 12a for fixing to the plate 8.

Furthermore, the channels are longitudinally delimited at their lower end by stops such as 13 for stopping the fruits, fastened to the profiles 11, 12 at the end of these latter opposite the flange 9 of the plate 8.

The structure for arranging the citrus fruits further has a fixed frame 18 supporting each tray 7, equipped with means for quickly fixing the said tray 7 which are adapted to cause the latter to be inclined by rotation with respect to the longitudinal axis of the wave conveyor 1.

These quick fixing means comprise a jack 14 which extends transversely with respect to the longitudinal axis of the wave conveyor 1 and the rod of which bears a joining block 15, to which is fastened a horizontal pin 16 forming the male part of the fork type attachment system of the tray 7, and consequently adapted to lodge in the cutout 10 and thus support the plate 8 and bring about its rotation with respect to the axis of the conveyor 1 upon the actuation of the jack 14.

As shown in FIG. 1, such a jack 14 makes it possible, by simple locking of the plate 8 on the frame 18 in terms of translation, with freedom to rotate about a vertical axis (for example vertical pin extending beneath the plate 8 and seated in an orifice made in the frame 18), to position the channels:

either in a first filling position, in which the channels form a first angle α1, for example of the order of 10 degrees, with the axis of the wave conveyor 1 (left-hand feed station in FIG. 1), or a second discharging position, in which the channels form, with the axis of the wave conveyor 1, a second angle α2 greater than α1, this angle α2 being determined according to the size of the citrus fruits and adapted so that the latter are aligned in parallel rows and columns and compressed against one another.

The packing device according to the invention further has two pickup heads 20, 21, each constructed to effect the transfer of the layers of products between one of the feed stations and the packing station.

These pickup heads 20, 21 may be of the type described in U.S. Pat. No. 5,661,949, to which reference may be made for further details, and thus comprise a suction plenum 22 beneath which is fixed an interchangeable plate bearing the pickup members such as 23 consisting of suction cups with bellows.

These pickup heads 20, 21 are connected to a tubular supporting framework 24 via displacing means capable of producing:

simple simultaneous pivoting of the two pickup heads, for displacing each of them alternately between one of the feed stations and the packing station, and vice versa, pivoting of each of the pickup heads 20, 21 about a horizontal axis, for pivoting it automatically so that it extends parallel to the plane of the channels when it is at the feed station and horizontally when it is at the packing station, and means for heightwise vertical displacement, for enabling the picking up of a layer at the feed station and the depositing of this layer in a container at the packing station.

To this end, each pickup head 20, 21 is fastened to the end of a jack rod 27 constructed to produce heightwise displacements, and bears two guide columns such as 26 mounted to slide relative to a guide block 25.

Furthermore, this guide block 25 is integral with a horizontal shaft 29 mounted rotatably in bearings such as 30 integral with a bracket 31.

The two brackets 31 are, for their part, fixed to a vertical mast 32 so as to extend in two perpendicular vertical planes so as to lead to alternate positioning of the pickup heads 20, 21 either vertically in line with a feed station or vertically in line with the packing station. For the purpose of this transfer between feed station and packing station, the mast 32 is, moreover, mounted rotatably in bearings with vertical axes, and its rotation is produced by a motor 33.

The adjustment of the inclination with respect to the horizontal of each pickup head 20, 21 during their displacement between the feed and packing stations results, for its part, from the presence of a tie rod 34 extending obliquely with respect to the vertical between the guide block 25 and an upper crosspiece 24a of the tubular framework 24 and mounted to pivot relative to this crosspiece 24a about a vertical axis offset horizontally by a suitable distance from the axis of the vertical mast 32.

The packing station has a conveyor 40 for supplying and removing the cartons.

This conveyor 40 comprises a fixed horizontal longitudinal track 41 borne by an underframe 42 and adapted to support the cartons, and consisting of a metal sheet bent so as to have a plane central zone forming the actual track, and on either side of the latter, two longitudinal stops such as 43 for centring and laterally guiding the said cartons.

This conveyor 40 further comprises means for driving the cartons capable of causing the latter to slide on the track 41 and having two endless chains such as 44 disposed on either side of the said track and constructed to move horizontally, and transverse drive bars such as 45, 46 fastened at their ends to the endless chains 44 so as to run in a circuit causing them to move horizontally above and below the track 41.

These drive bars 45, 46 are, furthermore, detachably mounted on the chains 44 by any demountable assembly means known per se, so as to have an adjustable centre distance allowing longitudinal spaces, of a length variable according to the length of the transported carton, to be delimited above the track 41.

The conveyor 40 is adapted to bring the cartons, deposited manually on the track 41 successively and individually, to a position vertically in line with the pickup heads 20, 21 for the purpose of filling a carton, in which filling position this carton is detected by a photoelectric cell (not shown) which controls the stoppage of the said conveyor 40.

The conveyor 40 further has means for expansion of the upper edge and for centring of the carton disposed in the filling position, which are adapted to be pressed against the inner faces of the inner walls of this carton, on the one hand to perfectly centre the latter and, on the other hand, to bring about appreciable expansion of the upper part of the said carton.

These expansion means comprise four flaps such as 50, 51 disposed so as to delimit a rectangular volume with a section matching that of the cartons, the said flaps each being fixed to the rod of a pneumatic jack such as 52, which is arranged vertically and the body of which is mounted on one of the crosspieces of a horizontal frame 53 disposed above the conveyor 40, in line with the track 41, and borne by the underframe 42 via means for adjusting the height of the said frame.

These height-adjusting means comprise four vertical threaded rods such as 54, 55 connected in terms of rotation by means of a pinion/endless chain assembly 56 extending horizontally beneath the track 41. These four threaded rods 54, 55 are disposed so as to surround the frame 53 bearing four nuts such as 57, each cooperating with one of the said rods so as to be able to adjust the vertical position of the said frame above the track 41 by means of a crank 58 integral with the upper end of one of the rods 54.

The flaps 50, 51 are, for their part, mounted on the rod of the associated jack 52 via a horizontal articulation axis allowing each of the said flaps to swing between two positions: a position of minimum spacing permitting the said flaps to penetrate partially into a carton without stressing the walls of the latter, and a position of maximum spacing, in which the said flaps are pressed against the walls of the carton and spread them, causing appreciable expansion of the carton.

For the purpose of obtaining automatic swinging of each of the flaps 50, 51 between their two end swinging positions upon actuation of the jacks 52, each flap 50, 51 is mounted on a lever 60 which is articulated on the rod of the associated jack 52 and on which there is also mounted a counterweight 61 with a weight greater than that of the flap 50, 51 and adapted to maintain the latter naturally in its position of minimum spacing.

Figure 4:
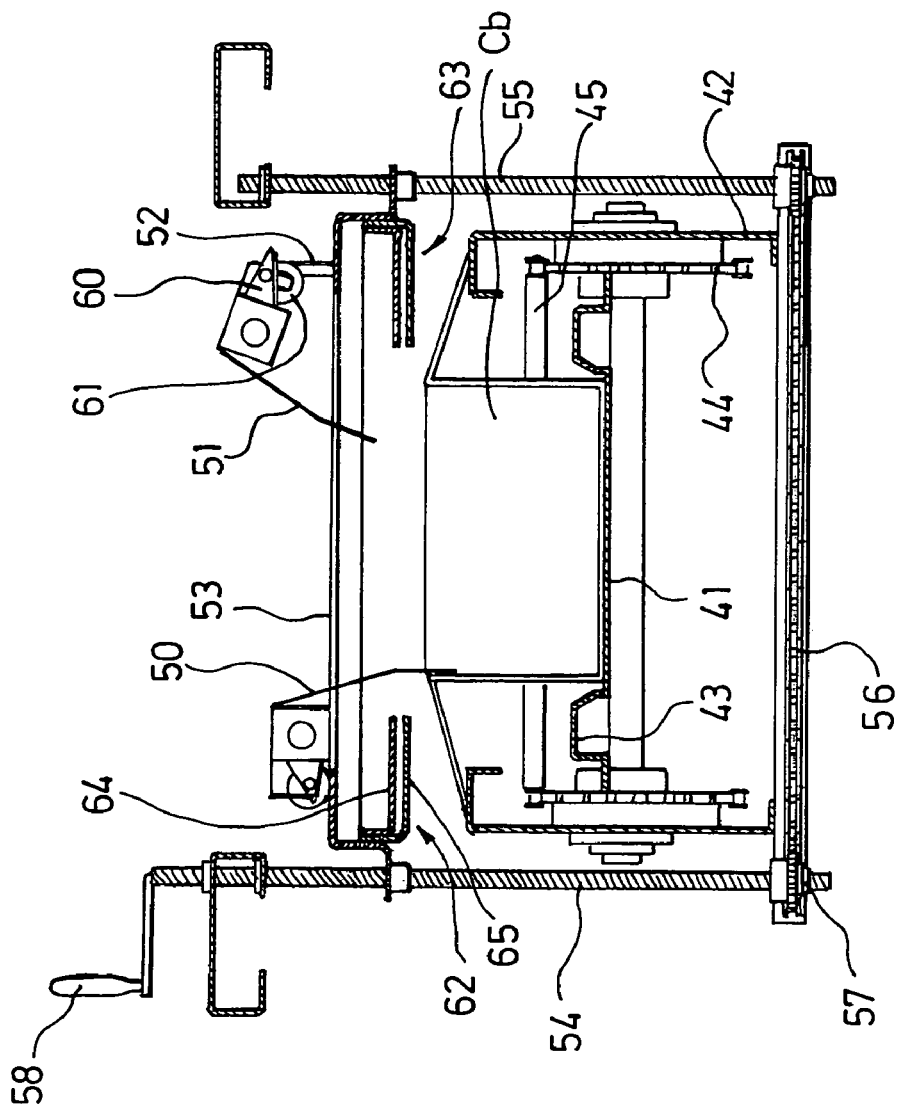
FIG. 4 is a section in a vertical plane showing the means for transporting the containers during the filling of a carton of low height.
Figure 5:
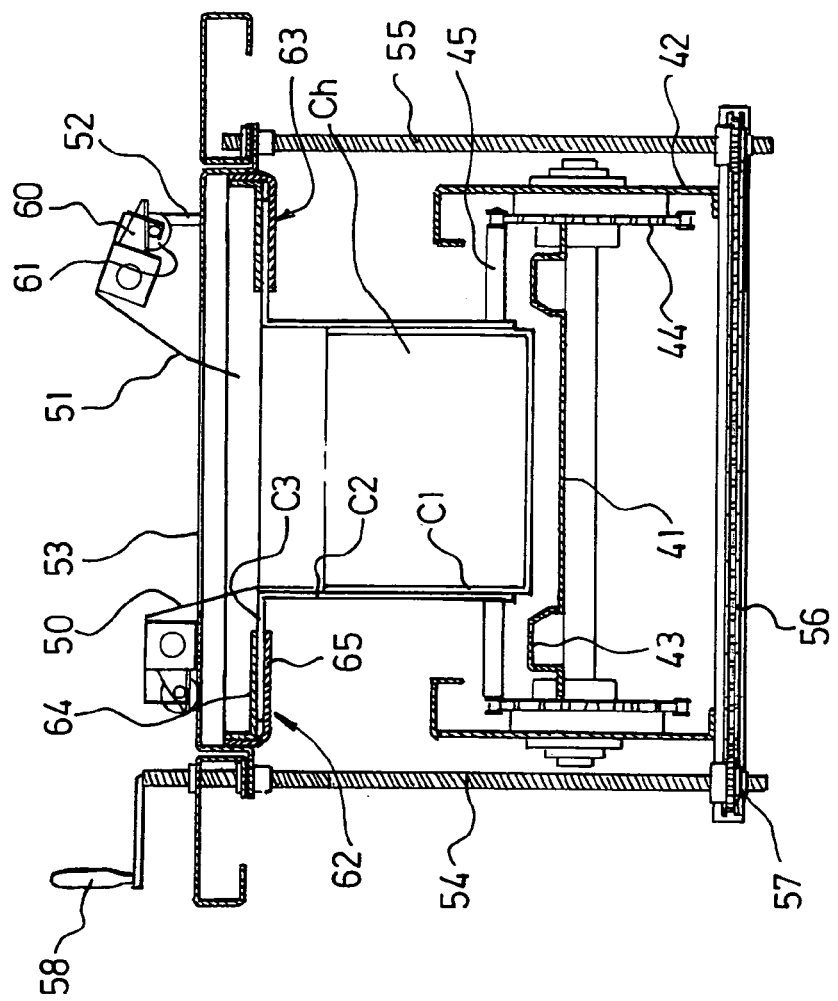
FIGS. 5 and 6 are two sections in a same vertical plane showing the means for transporting the containers during two successive steps of the filling of a carton of great height.
Figure 6:
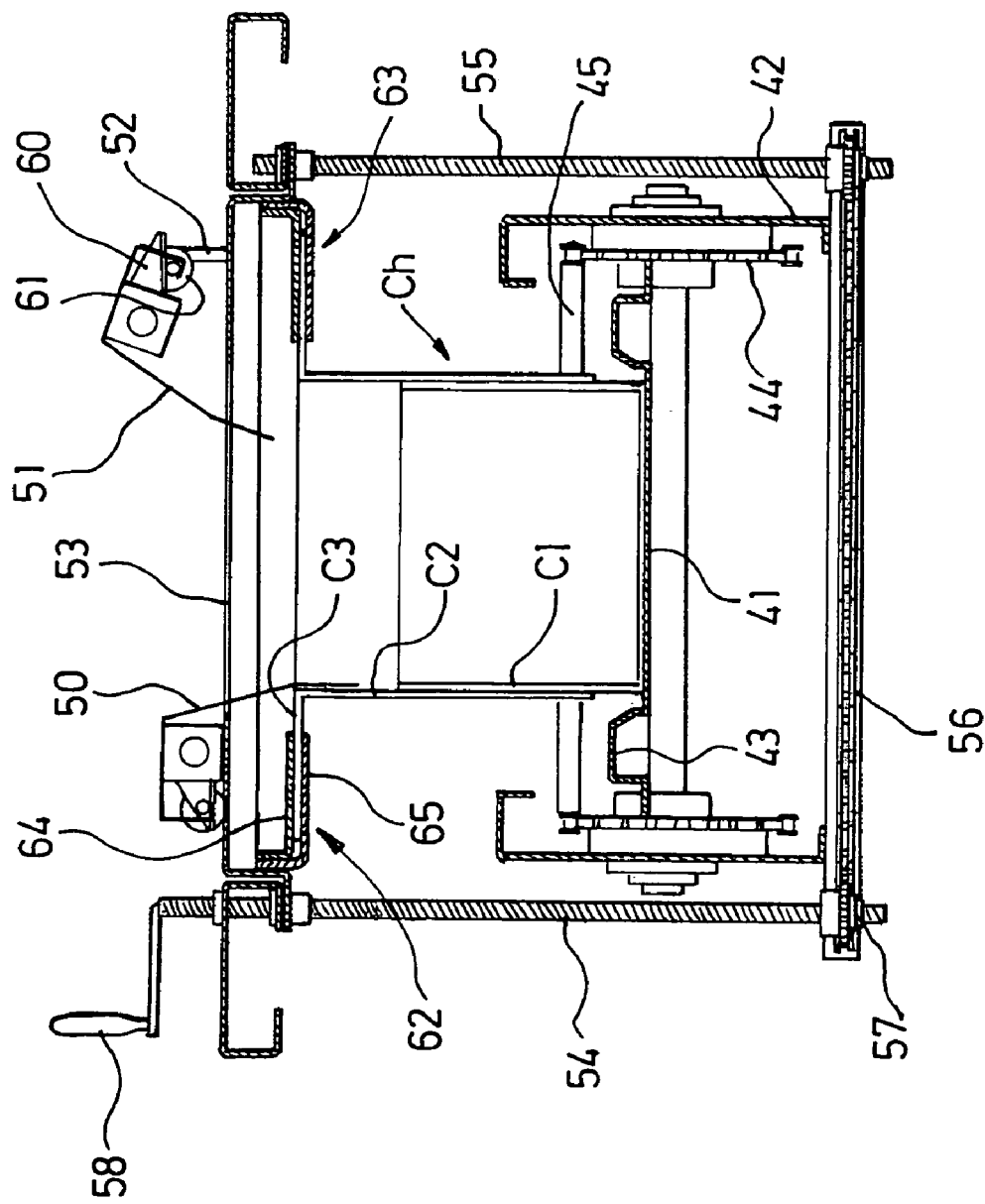

As shown in FIGS. 4 to 6, and for the purpose of producing automatic swinging of each of the flaps 50, 51, each jack 52/lever 60 assembly is, furthermore, fastened to the frame 53 so that:

in the deployed position of the jack 52, the lever 60 extends at a distance above the frame 53 so that the counterweight 61 naturally maintains the flap 50, 51 swung into its position of minimum spacing, upon retraction of the jack 52, the counterweight 61 comes to bear on the frame 53 so as to cause the lever 60 to swing and consequently the flap 50, 51 to swing towards its position of maximum spacing.

Furthermore, the frame 53 bears two longitudinal lateral slides 62, 63 adapted to extend longitudinally beneath the said frame and protruding as a continuation of the latter in the direction of the upstream end of the conveyor 40.

These two slides 62, 63, each intended to accommodate one of the upper flaps of a carton, as explained below, each consist of two horizontal metal sheets 64, 65 forming between them a space for guiding the said flap, the said metal sheets being bent at their upstream end so as to define a cone 66 for introducing the flap into the slide.

These two slides 62, 63 are intended to be optionally used during the filling of "high" cartons Ch which consist customarily of two portions having a section adapted to telescope one in the other: a lower portion C1 bearing the flaps forming the bottom of the carton Ch, and an upper portion C2 bearing the upper flaps C3 intended to be folded down for the purpose of closing the carton Ch once the latter is full.

More specifically, these slides 62, 63 are used during the filling of a high carton Ch of the aforementioned type when the number of layers and the size of the fruits intended to fill this carton are such that there is a risk of the top layer being flush with the upper face of the said carton or even projecting beyond this upper face, thus leading to difficulties with the closing of the carton and formation of a stable stack of the said cartons, and a risk of bruising the fruits.

To this end, and for the purpose of eliminating these potential risks, and as shown in FIGS. 5 and 6, first of all the height of the frame 53 is adjusted so that once the upper flaps C3 of the carton Ch have been manually introduced into the slides 62, 63 at the cone 65 for entry into these latter, the bottom of this carton is lifted off from the track 41 and thus does not rest on the latter (FIG. 5).

Furthermore, the vertical travel of the pickup heads 20, 21 is calculated, during the transfer of the first layer of fruits deposited in the carton Ch, so that the depositing of this layer causes the lower portion C1 of the said carton Ch to slide downwards, leading to an increase in the height of the latter by a value ensuring a safety margin with respect to the overall height of the layers of fruits intended to be disposed in this carton, (FIG. 6).

In contrast, as shown in FIG. 4, the slides 62, 63 are not used during the filling of low cartons Cb. Similarly, they are not used during the filling of high cartons Ch when a safety margin is unnecessary.

Figure 2:
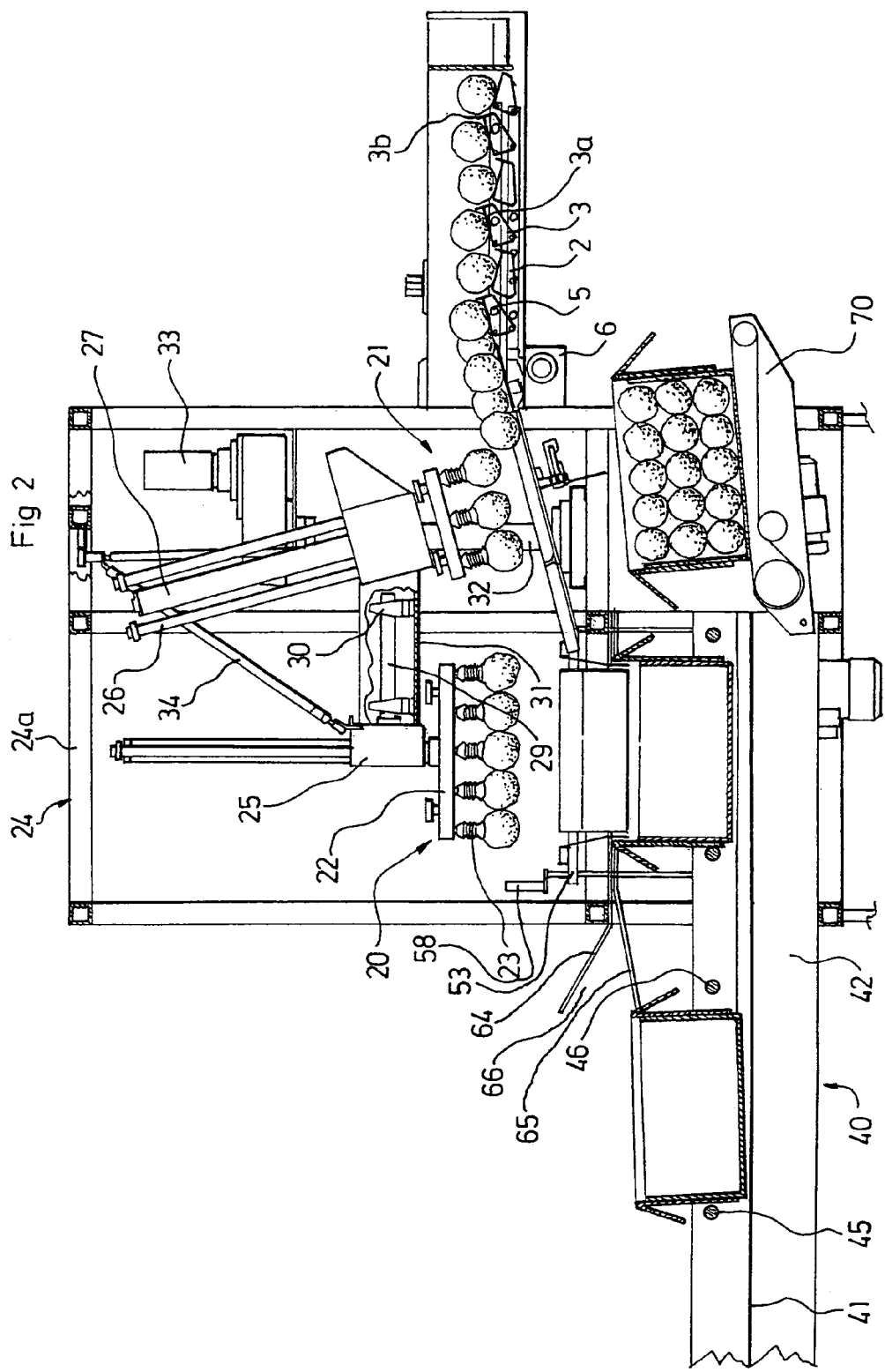
FIG. 2 is a section in a vertical plane A at the means for displacing the pickup heads.

Finally, as shown in FIG. 2, and in customary fashion, the conveyor 40 has a terminal conveying portion 70 for removal of the full cartons Cb or Ch.

The invention may have numerous alternative embodiments to the embodiment described above and shown in the figures, which is given purely by way of non-limiting example.

The invention claimed is:

1. Automatic packing device for the filling of containers by means of superposed layers of products, in particular fruits such as oranges, of the type comprising:

a device for transporting the products which is capable, from a flow of products delivered in bulk, of dividing this flow into two separate streams, two separate feed stations, each feed station being adapted to receive and arrange one of the two streams of products, and comprising a conveyor and, as a longitudinal downstream continuation of this conveyor, a plurality of parallel channels, each adapted to accommodate a plurality of products aligned one following the other in a row in this channel and in parallel rows in a same plane of reception of the products defined by the said channels, a central packing station having a device for positioning each container which is capable of holding the said container for the purpose of filling it, a pickup device capable of picking up alternately, in line with each feed station, a number of products forming a layer with dimensions matching the internal section of the container, and of depositing this layer in the said container so as to fill the latter by means of superposed layers of products fixed relative to one another, wherein it comprises a device for pivoting the channels of each feed station capable of simultaneously pivoting the said channels in a plane parallel to the plane of reception of the products defined by these channels, between a first position for filling the latter in which their longitudinal axis is oriented so as to form a first angle ($\alpha 1$) with the longitudinal axis of the conveyor, and a second position for discharging the channels which is adapted so that the products accommodated in the latter are aligned in orthogonal rows and columns and is obtained for a second angle ($\alpha 2$) between the longitudinal axes of the conveyor and the channels, this second angle ($\alpha 2$) being greater than the first angle ($\alpha 1$), so that the products accommodated in the various adjacent channels are more tightly packed laterally one against the other in the second position than in the first position.

2. Packing device as claimed in claim 1, wherein:

the conveyor of each feed station has a plurality of transverse profiles disposed orthogonally with respect to the direction of movement of the said conveyor and articulated about a pivot axis orthogonal to the said direction of movement, each feed station has a device for pivoting the profiles capable of pivoting them about their pivot axis, so that two successive profiles are caused to pivot in opposite directions of rotation between two end positions: a first position in which the said two successive profiles form a transverse trough in the general shape of a V, and a second position in which the said two successive profiles form a ridge in the general shape of an inverted V.

3. Packing device as claimed in claim 2, wherein the channels extend along a descending slope starting from the conveyor.

4. Packing device as claimed in claim 3, wherein the pickup device has:
two pickup heads associated with a pivoting device capable of pivoting each pickup head about a horizontal axis between a position for picking up a layer of products disposed in the channels of a feed station, and a position for depositing this layer of products in a container,
a device for displacing the pickup heads capable of placing them alternately between a feed station for the purpose of picking up a layer of products and the packing station for the purpose of depositing this layer in a container,
and a device for vertically displacing the pickup heads capable of displacing them independently between a high position for transfer between a feed station and the packing station and low positions for respectively picking up and depositing the layers of products.

5. Packing device as claimed in claim 1, wherein the channels of each feed station are mounted on a framework equipped with members for removable fixture capable of enabling it to be fastened to an underframe of the said feed station.

6. Packing device as claimed in claim 1, wherein the packing station comprises a conveyor for supplying and removing the containers, and members for positioning a container for the purpose of filling it and capable of immobilising the said container in a filling position between the two feed stations.

7. Packing device as claimed in claim 6, wherein the members for positioning a container comprise members for expansion of the container disposed in the filling position, capable of pressing against inner faces of an upper end of the walls of this container and bringing about appreciable expansion of the latter.

8. Packing device as claimed in claim 6, wherein the positioning members comprise four expansion flaps disposed so as to delimit a volume of rectangular section matching that of the container, the said flaps being borne by pivoting members capable of pivoting them about a horizontal axis between a position in which they extend vertically and spread the walls of the container, and a position in which they extend in an inclined plane and are retracted above the upper face of the container.

9. Packing device as claimed in claim 6, wherein the positioning members are mounted on a framework bearing the conveyor for supplying and removing the containers via a device for height adjustment of the said positioning members capable of permitting adjustment of their relative vertical position with respect to the said conveyor for supplying and removing the containers.

10. Packing device as claimed in claim 9, wherein it comprises two longitudinal slides borne by the device for height adjustment of the expansion members and each adapted to accommodate an upper flap of a container.

11. An automatic packing device for filling containers with superposed layers of products, said device comprising:
a transporting device for transporting and dividing a flow of products into two separate streams;
two separate feed stations, each of said feed stations receives and arranges one of the two streams of products, and comprises a conveyor and, as a longitudinal downstream continuation of said conveyor, a plurality of parallel channels, each of said channels accommodates a plurality of products aligned one following the other in parallel rows in a plane of reception of the products defined by said channels;
a central packing station having a device for positioning each of said containers and holding a respective one of said containers for filling said one of said containers;
a pickup device that picks up a number of products forming a layer and deposits the layer in said one of said containers so as to fill said one of said containers with a superposed layers of products fixed relative to one another; and
a pivoting device that pivots said channels of each feed station in a plane parallel to said plane of reception of the products defined by said channels, between a first position for filling said channels in which a longitudinal axis of said channels is oriented so as to form a first angle with a longitudinal axis of said conveyor, and a second position for discharging said channels so as to form a second angle between the longitudinal axis of the conveyor and the longitudinal axis channels, said second angle being greater than said first angle.

* * * * *